(12) United States Patent
Collazo (10) Patent No.: US 7,537,226 B1
(45) Date of Patent: May 26, 2009

(54) LIGHT TRUCK SUPPORT LIFT

(76) Inventor: Hector Collazo, 8517 Mizell Dr., Viera, FL (US) 32940

( * ) Notice: Subject to any disclaimer, the term of this patent is extended or adjusted under 35 U.S.C. 154(b) by 0 days.

(21) Appl. No.: 11/872,978

(22) Filed: Oct. 16, 2007

Related U.S. Application Data (63) Continuation-in-part of application No. 11/221,336, filed on Sep. 7, 2005, now abandoned.

(51) Int. Cl.
*B60G 11/00* (2006.01)
(52) U.S. Cl. .......................... 280/124.175; 280/124.17; 267/271; 267/260; 267/265
(58) Field of Classification Search ............ 280/124.17, 280/124.175, 124.173; 267/271, 260, 262, 267/265
See application file for complete search history.

(56) References Cited

U.S. PATENT DOCUMENTS

| 1,796,235 A | 3/1931 | Billingsley |
| 4,998,749 A | 3/1991 | Bockowitz |

FOREIGN PATENT DOCUMENTS

| JP | 6-179377 | * 6/1994 |

* cited by examiner

*Primary Examiner*—Ruth Ilan
(74) *Attorney, Agent, or Firm*—Michael J. Kroll (57) ABSTRACT

A light truck support lift which is positioned between the existing leaf spring eyelet and the truck body which incorporates fastener adjustable members for varying the height of the lift.

17 Claims, 10 Drawing Sheets

LIGHT TRUCK SUPPORT LIFT

RELATED APPLICATIONS

This is a continuation-in-part of Ser. No. 11/221,336 filed 7 Sep. 2005 now abandoned, the contents of which are herein incorporated by reference.

BACKGROUND OF THE INVENTION

1. Field of the Invention

The present invention relates generally to motor vehicle suspension and, more specifically, to a light truck support lift which is positioned between the existing leaf spring eyelet and the truck body which incorporates fastener adjustable members for varying the height of the lift.

2. Description of the Prior Art

There are other lift devices designed for motor vehicle suspensions. While these lift devices may be suitable for the purposes for which they were designed, they would not be as suitable for the purposes of the present invention, as hereinafter described.

SUMMARY OF THE PRESENT INVENTION

A primary object of the present invention is to provide a motor vehicle suspension lift device that is inserted between the leaf spring and the truck body.

Another object of the present invention is to provide a motor vehicle suspension lift device comprising a pair of mating supports having a plurality of apertures therethrough for placing fasteners therein.

Yet another object of the present invention is to provide a motor vehicle suspension lift device comprising a pair of mating supports wherein a first pair comprises planar bar stock having extending wall portions forming a substantially U-shape.

Still yet another object of the present invention is to provide a motor vehicle suspension lift device comprising a pair of mating supports which are substantially planar and dimensioned to reside within the walls of the first pair of supports.

Another object of the present invention is to provide a motor vehicle suspension lift device comprising a pair of mating supports having a plurality of coaligned apertures whereby said pair of supports can be releasably fastened one to the other.

Yet another object of the present invention is to provide a motor vehicle suspension lift device having a bushing positionable between the top most members and fastenable to the vehicle body.

An additional object of the present invention is to provide one or more spacers for adjusting the fit of the bushing.

Still yet another object of the present invention is to provide a motor vehicle suspension lift device wherein the bottom most apertures of the lift support are spaced apart to receive the spring eyelet bushing.

Additional objects of the present invention will appear as the description proceeds.

The present invention overcomes the shortcomings of the prior art by providing a light truck support lift which is positioned between the existing leaf spring eyelet and the truck body which incorporates fastener adjustable members for varying the height of the lift.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Lift Support System for Light Trucks of the present invention. With regard to the reference numerals used, the following numbering is used throughout the various drawing figures.

10 Lift Support System for Light Trucks of the present invention
12 chassis attachment assembly
14 leaf spring attachment assembly
16 vehicle chassis
18 leaf spring
20 prior art
22 light truck
24 bushing
26 receiving bar of 14
28 extension bar of 12
30 channel of 26
32 fastener apertures
34 bolt
36 nut
38 leaf spring bracket of 16
40 washer
42 spacer
44 main plate of 26
46 sidewall of 26
48 inner side of 26
50 central throughbore of 24
52 central throughbore of 42
54 cylinder kit
56 rivet
58 leaf spring eyelet

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
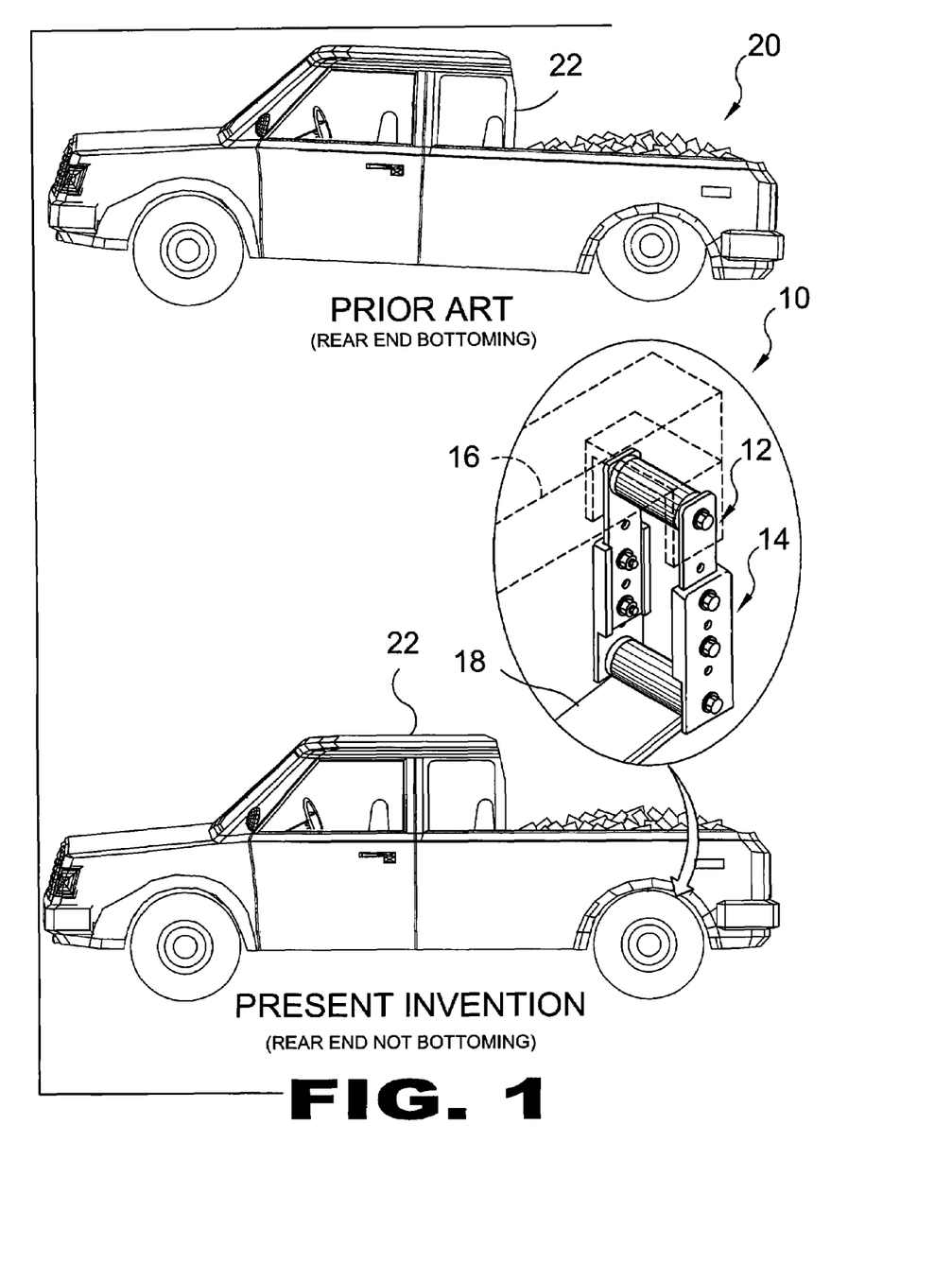
FIG. 1 is an illustrative view of prior art and of the present invention.

FIG. 1 is an illustrative view of prior art 20 and of the present invention 10. The present invention is a lift support system for light trucks 10, which is adjustable to elevate the rear of a light truck 22 or other such vehicle to a needed height depending on the demand of the user. The system comprises an upper chassis attachment assembly 12 that fastens to the chassis 16 and a lower leaf spring attachment assembly 14 that is secured to the leaf spring 18 of the suspension system to lift the bed of the vehicle.

Figure 2:
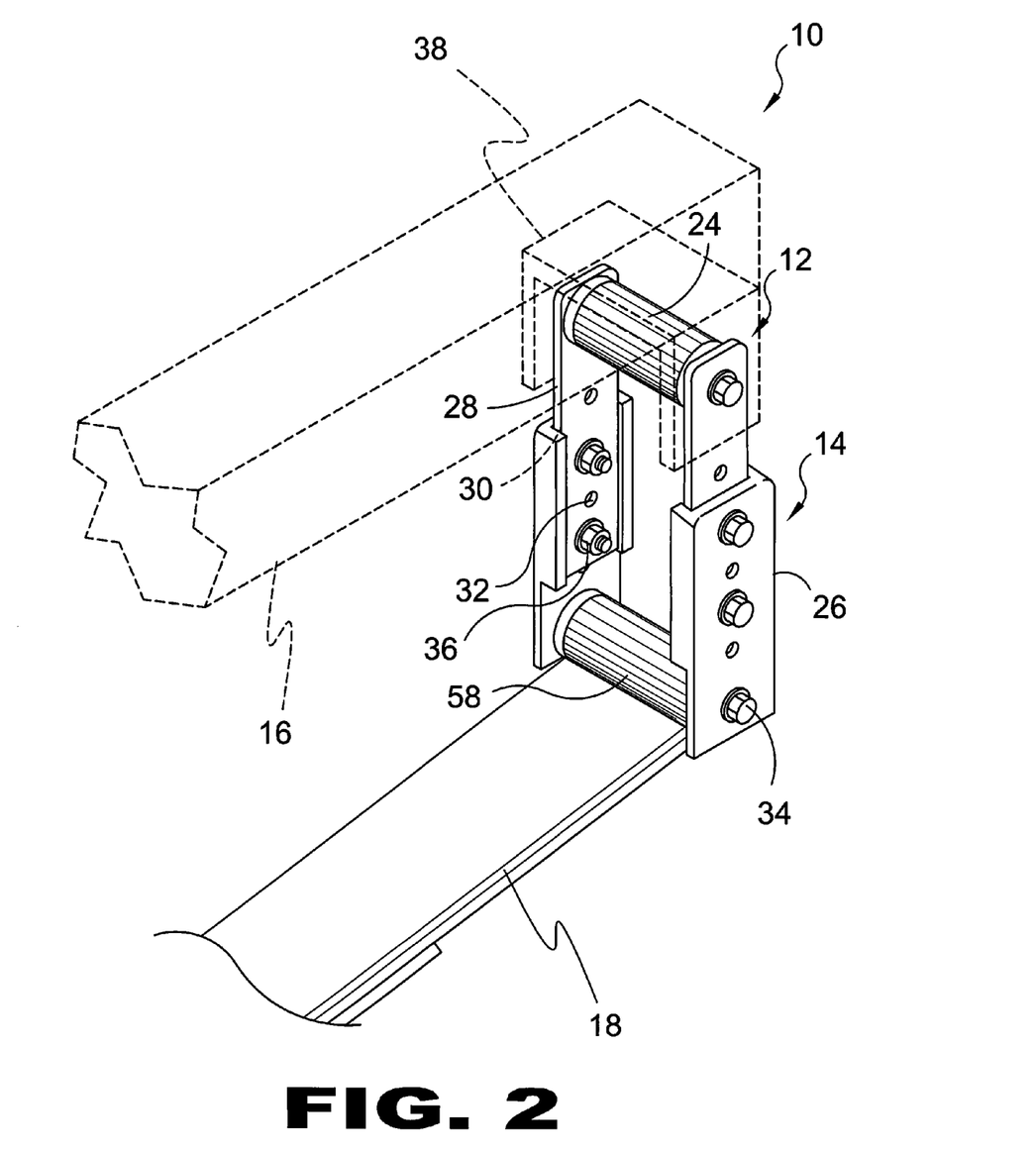
FIG. 2 is a perspective detail view of the present invenfion.

FIG. 2 is a perspective detail view of the lift support system 10 for light trucks, which is adjustable to elevate the rear of a light truck to a needed height depending on the demand of the user. The present invention 10 provides a leaf spring attachment assembly 14 that is selectively attachable to a mating chassis attachment assembly 12. The leaf spring attachment assembly 14 comprises a pair of substantially U-shaped receiving bars 26. The chassis attachment assembly 12 comprises a bushing 24 with a pair of substantially flat, elongate extension bars 28 extending perpendicularly downward from the ends of their respective bushing 24. The extension bars 28 are positioned and dimensioned to reside within the channels 30 defined by the U-shaped configuration of the receiving bars 26. A plurality of coaligned fastening apertures 32 linearly disposed along the lengths of the receiving bars 26 and the extension bars 28 for receiving bolt 34 and nut 36 fasteners to adjoin the two assemblies together. The bushing 24 of the chassis attachment assembly 12 is bolted to the leaf spring bracket 38 integral with the chassis 16 and the receiving bars 26 of the leaf spring attachment assembly 18 are bolted to the eyelet 58 of the leaf spring 16.

Figure 3:
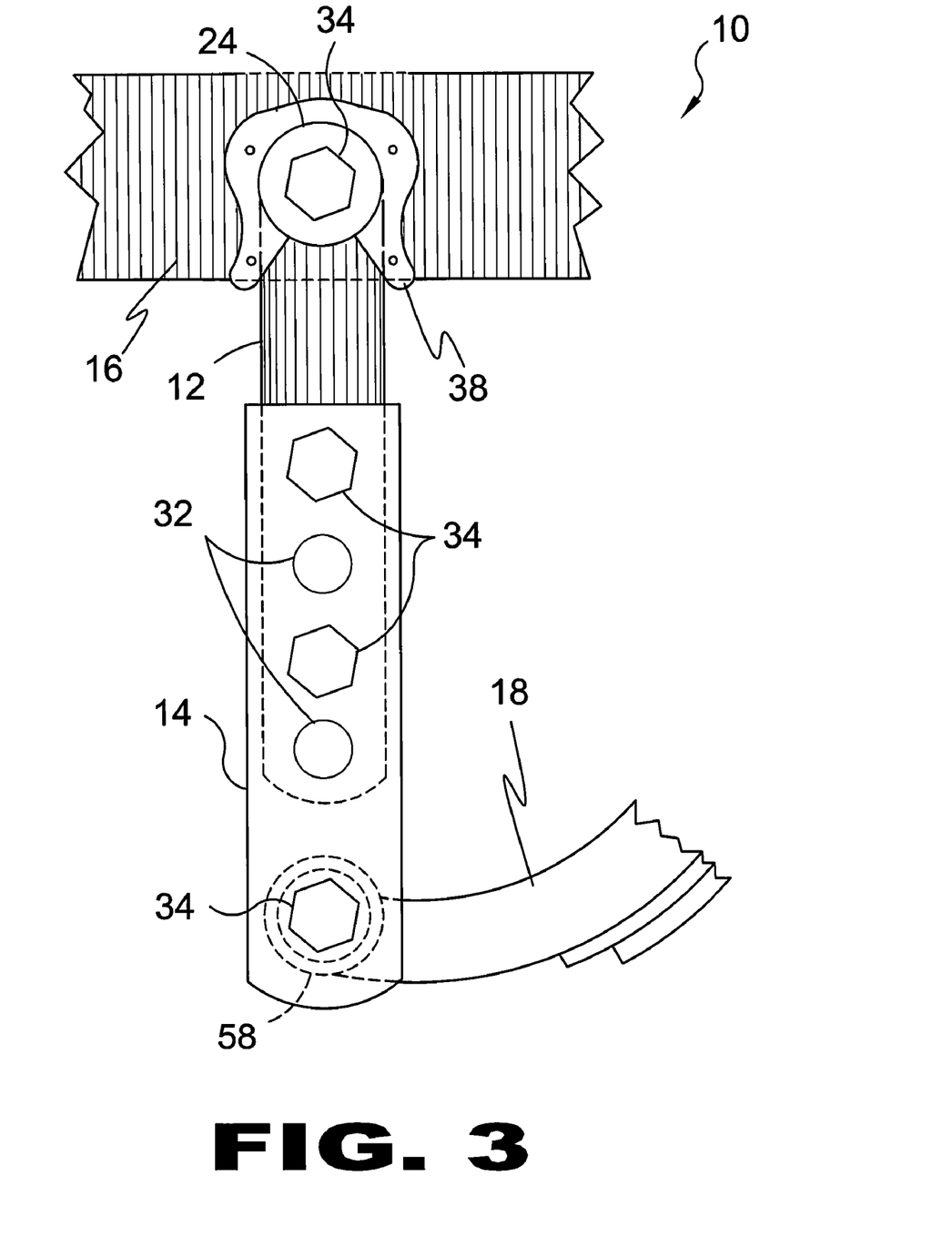
FIG. 3 is an orthographic view of the present invention.

FIG. 3 is an orthographic view of the present invention 10. Shown is the lift support system for light trucks 10 which is adjustable to elevate the rear of a light truck to a needed height depending on the demand of the user. The bushing 24 of the chassis attachment assembly 12 is retained within the leaf spring bracket 38 of the chassis 16 and the leaf spring attachment assembly 14 is fastened to the eyelet 58 of the leaf spring 18 with a bolt 34 placed through the selected fastener apertures 32.

Figure 4:
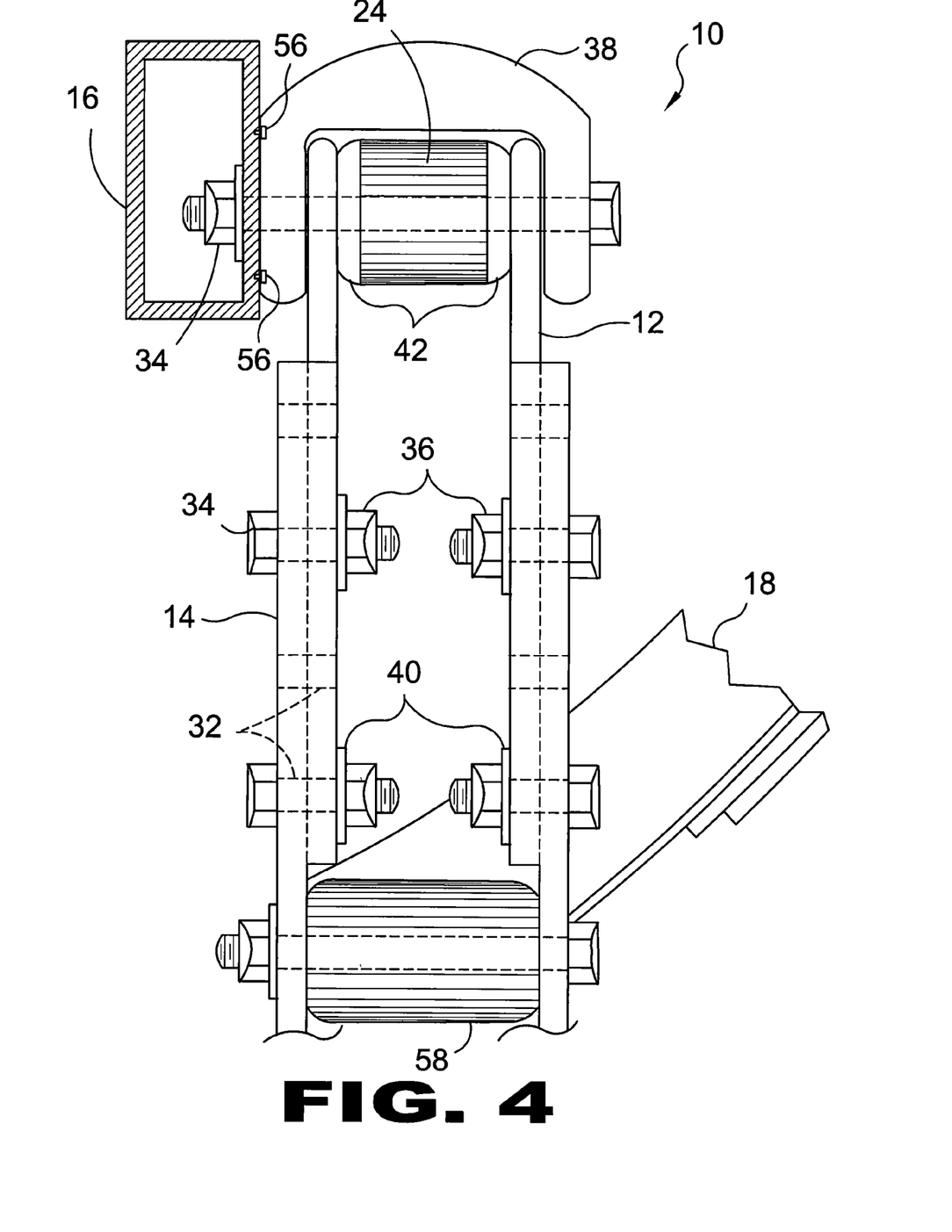
FIG. 4 is a rear view of the present invention.

FIG. 4 is a rear view of the present invention 10. Shown is the lift support system for light trucks 10 which is adjustable to elevate the rear of a light truck to a needed height depending on the demand of the user. The bushing 24 of the chassis attachment assembly 12 is retained within the leaf spring bracket 38 riveted 56 to the chassis 16 and the receiving bars 26 of the leaf spring attachment assembly 14 is fastened to the eyelet 58 of the leaf spring 18 with a bolt 34 placed through the selected fastener apertures 32 and secured thereto with a nut 36 and washer 40. A plurality of spacers 42 of varying thicknesses are provided to adapt the length of the bushing 24 accordingly to the vehicle.

Figure 5:
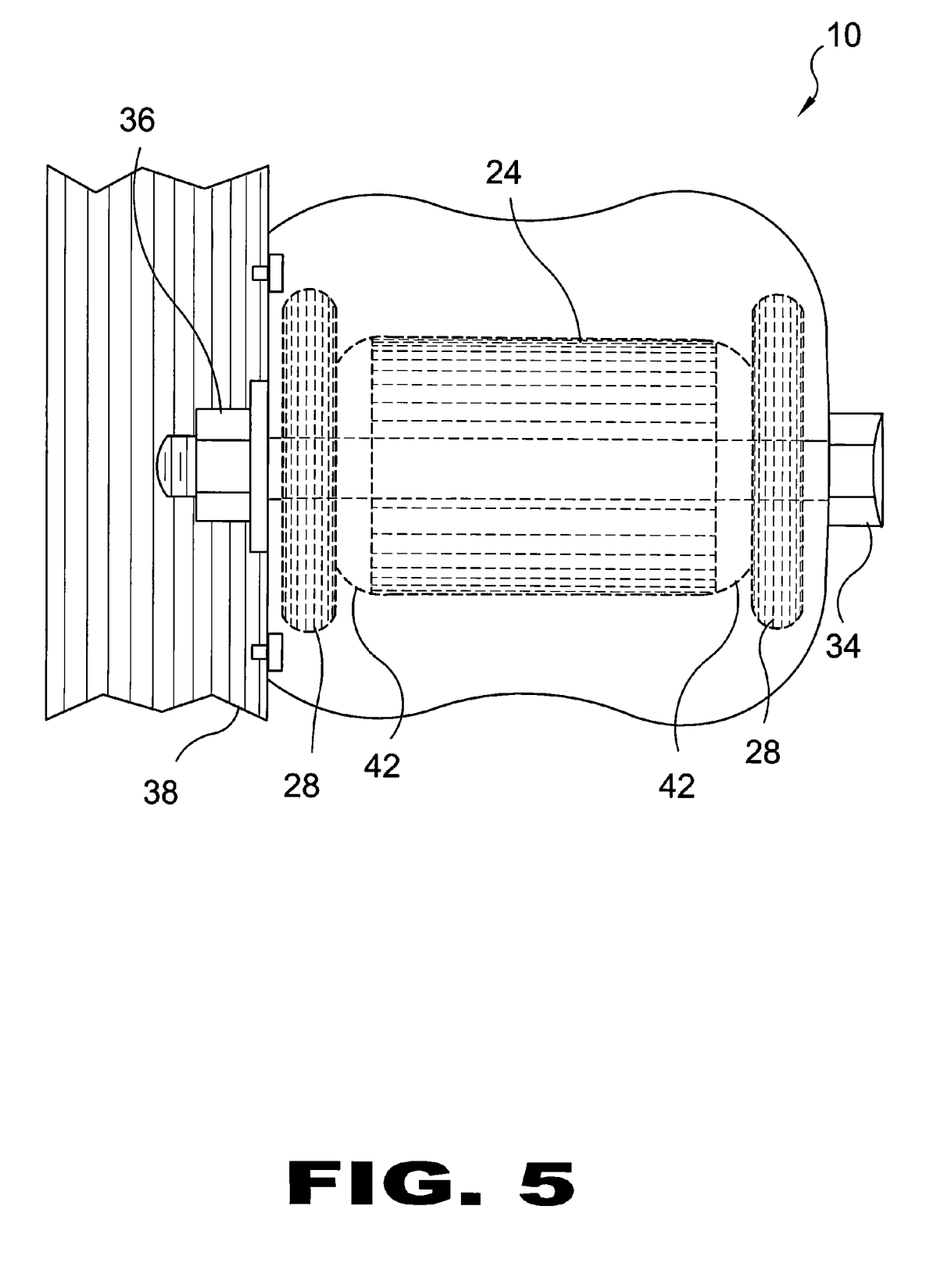
FIG. 5 is a top view of the present invention.

FIG. 5 is a top view of the present invention 10 showing the bushing 24 of the chassis attachment assembly 12 fastened to the leaf spring bracket 38 of the chassis with a bolt 34, nut 36 and washer 40 assembly. The extension bars 28 are bolted on the side of the spacers 42 opposing the bushing 28

Figure 6:
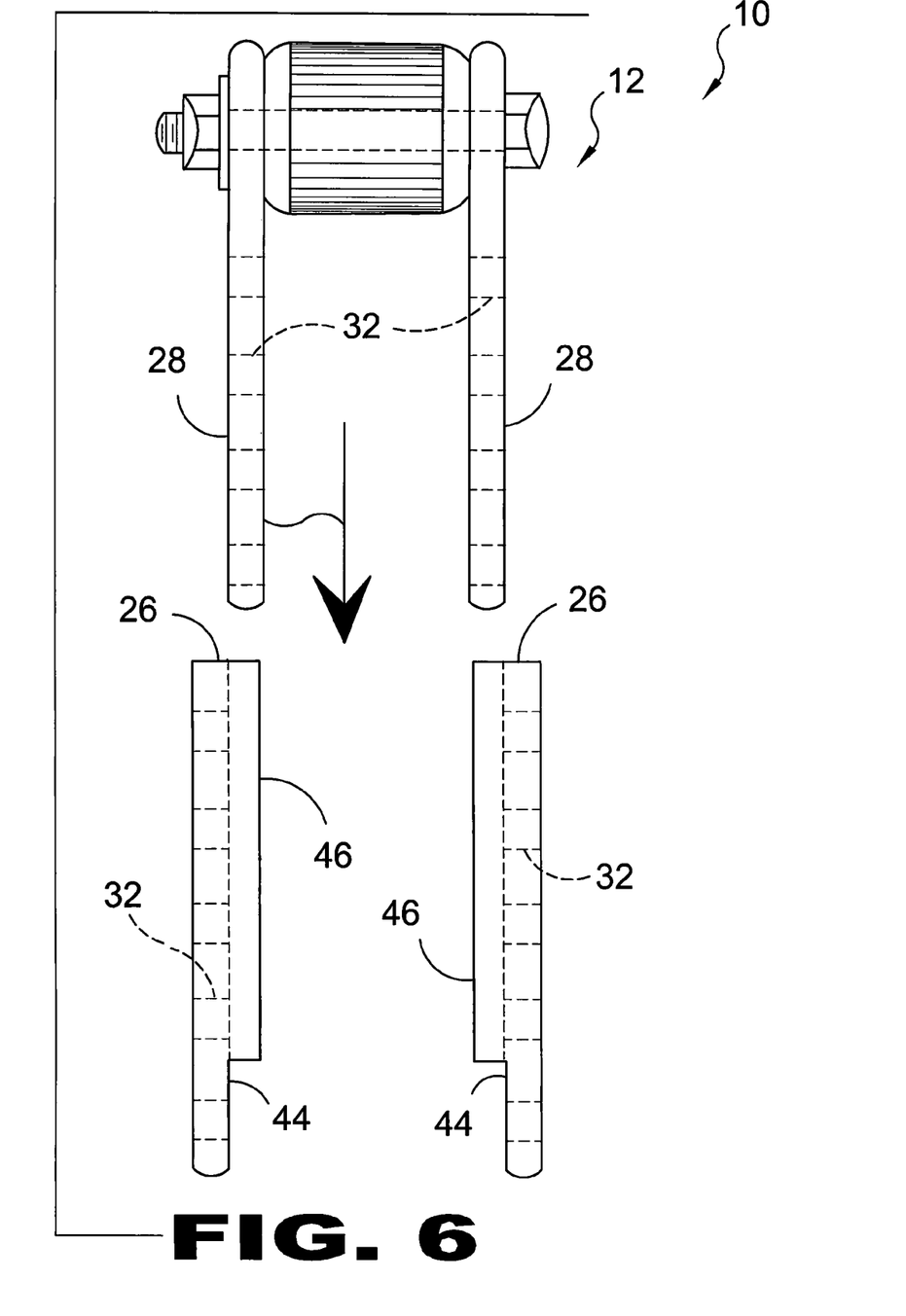
FIG. 6 is a view of the lift support system of the present invention.

FIG. 6 is a view of the lift support system of the present invention 10. Shown is a fully assembled chassis attachment assembly 12 and the receiving bars 26 of the mating leaf spring attachment assembly. The receiving bars 26 comprise a main plate 44 with sidewalls 46 depending from opposing edges thereof that form the channel to receive the extension bars 28 of the chassis attachment assembly 12. Also shown are the fastener apertures 32 disposed in the main plate 44 of the receiving bar 26 and in the extension bar 28. The alignment of the apertures 32 of the associated bars determine the length of the lift support 10 once bolted together.

Figure 7:
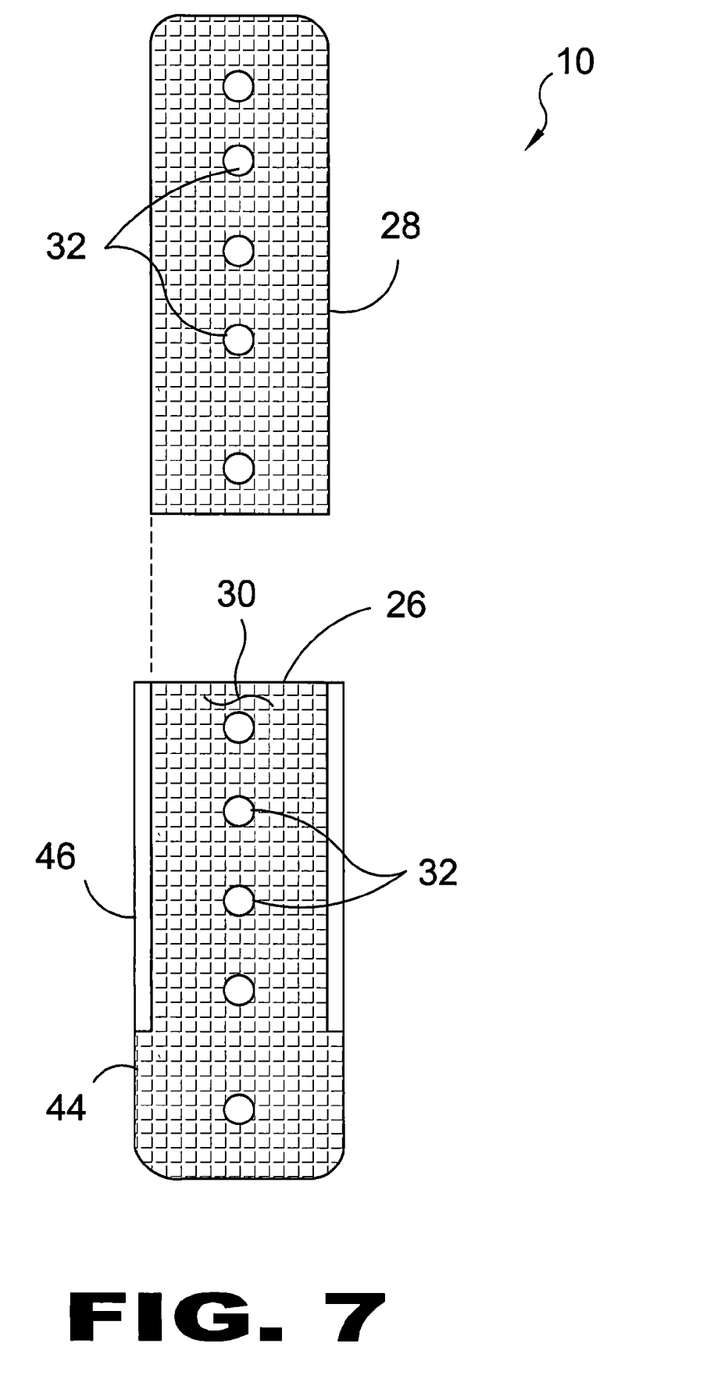
FIG. 7 is a view of the present invention.

FIG. 7 is a view of the present invention 10 demonstrating the relationship between the inner side 48 of the receiving bar 26 and the extension bar 28. The sidewalls 46 depending from the main plate 44 define the channel 30 that receives the extension bar 28 therein and the overall length thereof is determined by the alignment of the fastener apertures 32.

Figure 8:
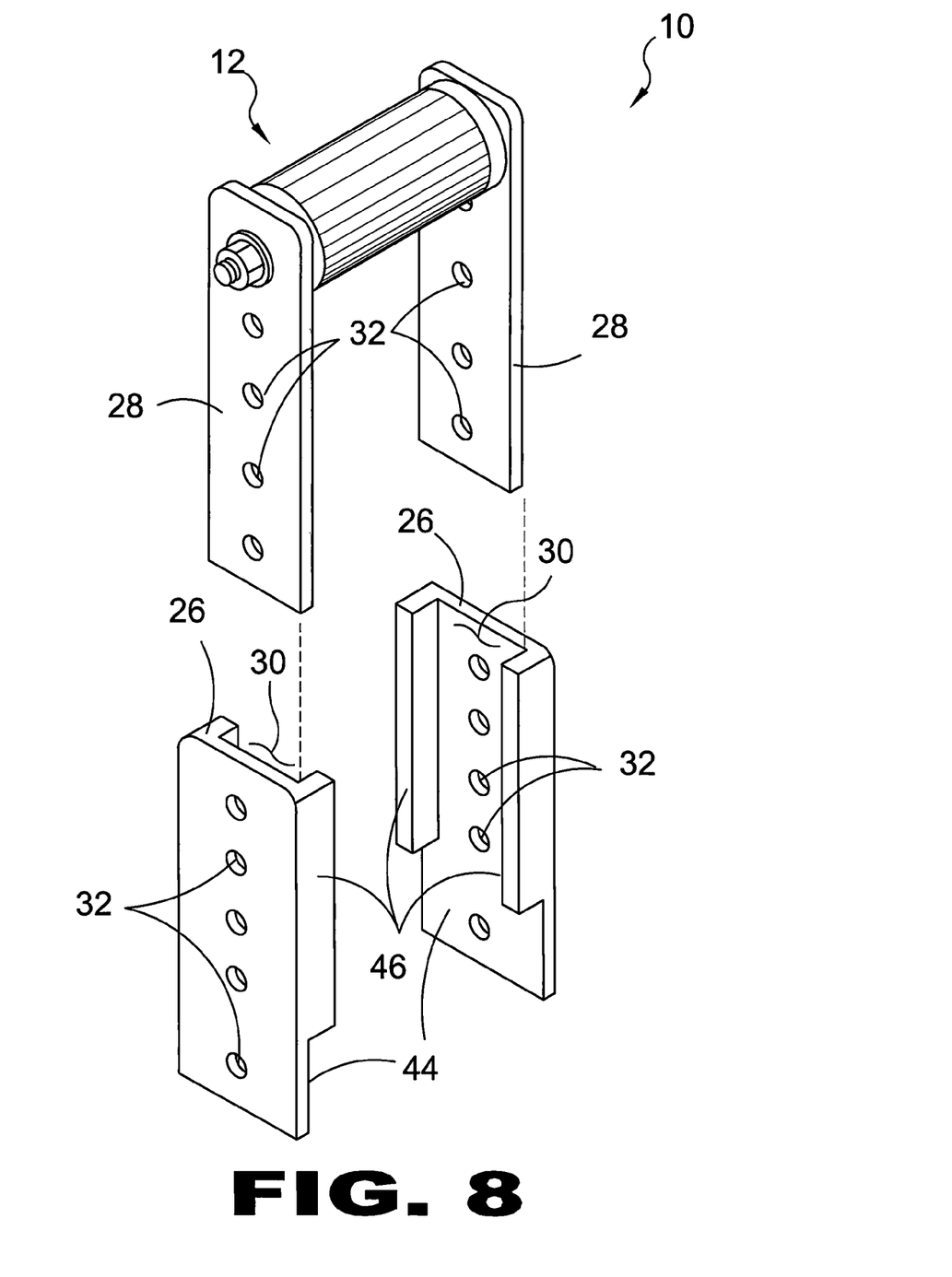
FIG. 8 is a perspective view of the present invention.

FIG. 8 is a perspective view of the present invention 10. Shown is a fully assembled chassis attachment assembly 12 and the receiving bars 26 of the mating leaf spring attachment assembly. The receiving bars 26 comprise a main plate 44 with sidewalls 46 depending from opposing edges thereof that form the channel 30 to receive the extension bars 28 of the chassis attachment assembly 12. Also shown are the fastener apertures 32 disposed in the main plate 44 of the receiving bar 26 and in the extension bar 28.

Figure 9:
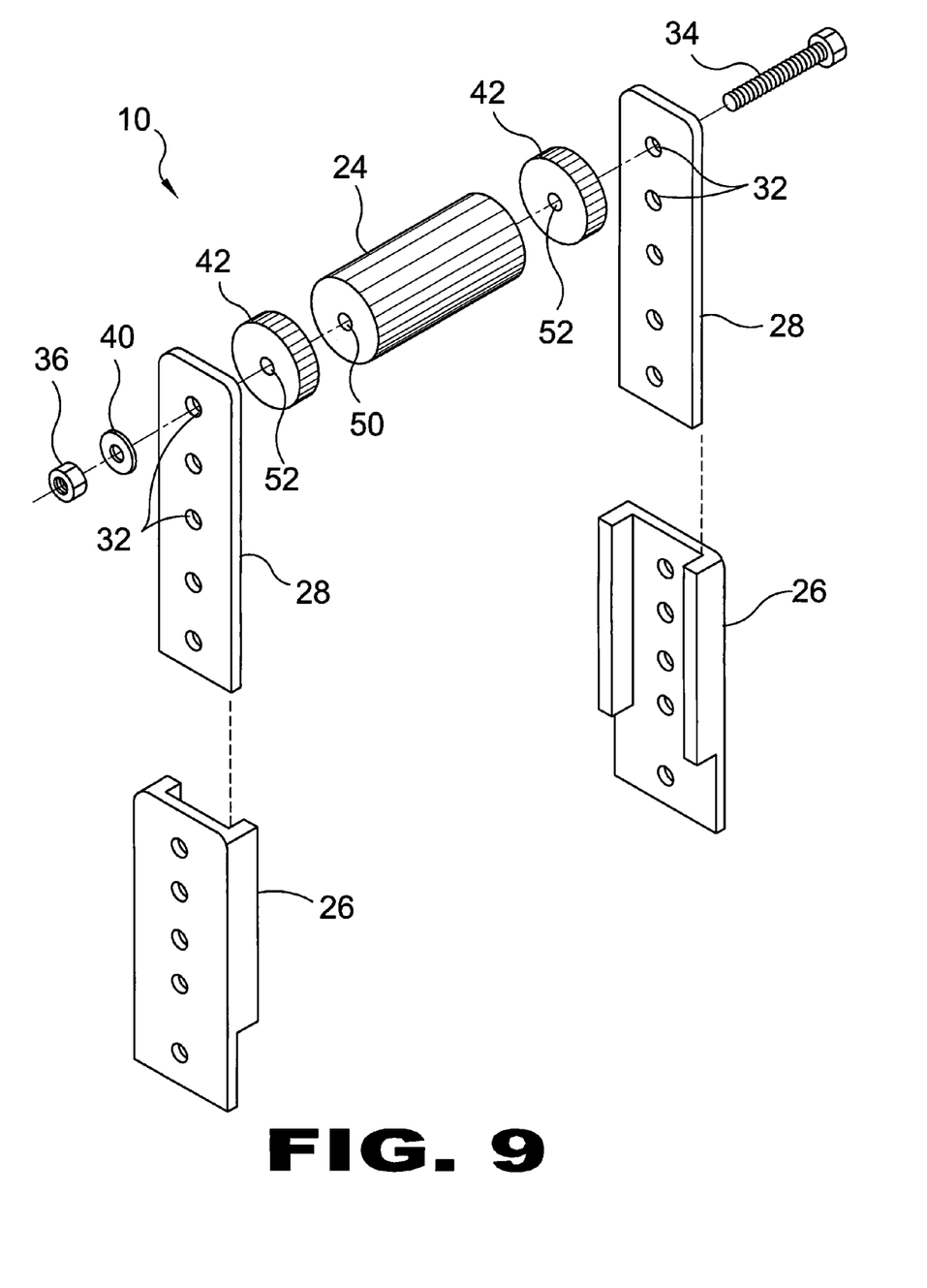
FIG. 9 is an exploded view of the cylinder kit of the present invention.

FIG. 9 is an exploded view of the chassis attachment assembly 12 and the mating receiving bars 26. The bushing 24 is united by a bolt 34 passing through the top fastener aperture 32 of the extension bars 28 and the central spacer throughbore 52 in the spacers 42 and the central bushing throughbore 50.

Figure 10:
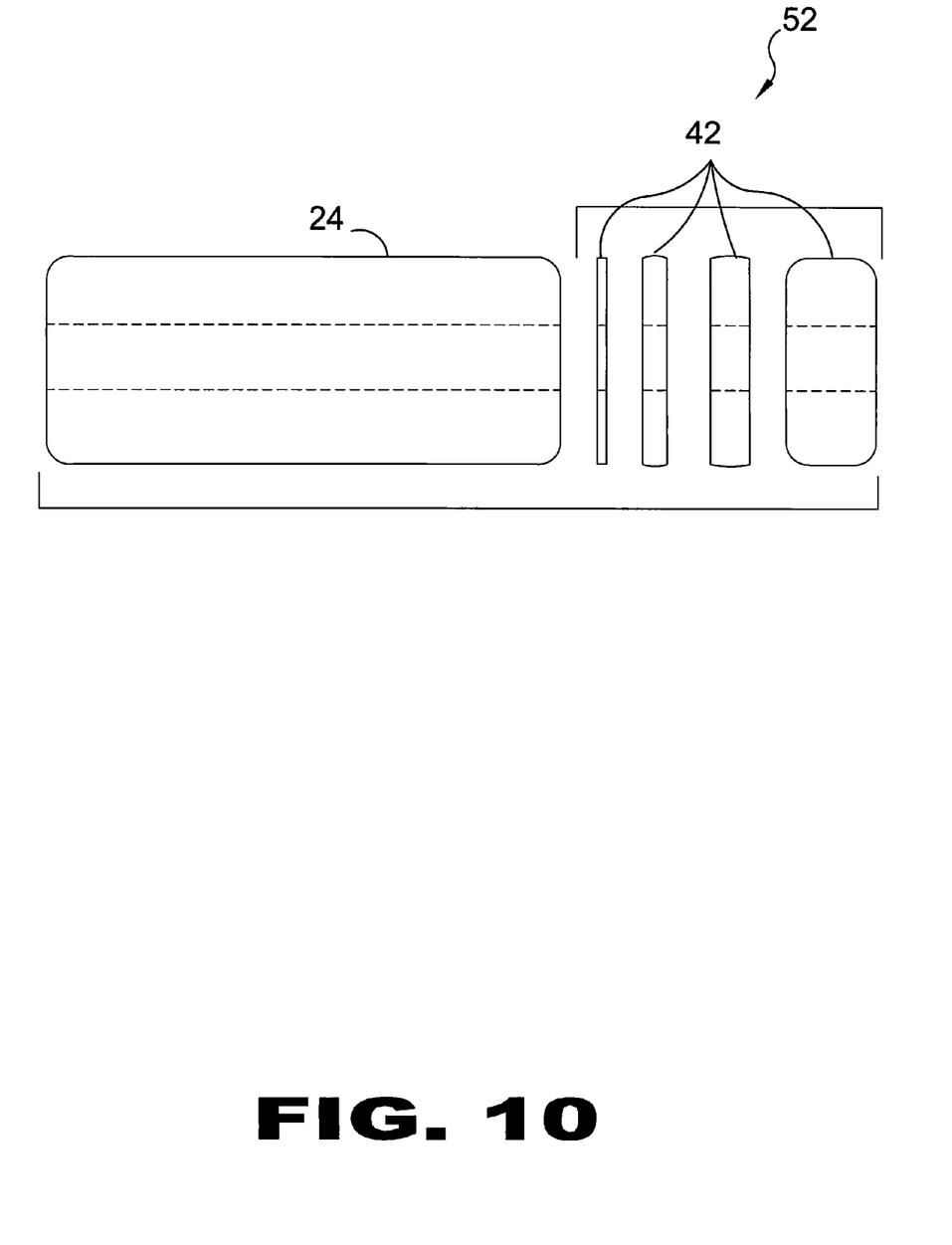
FIG. 10 is an orthographic view of the cylinder kit of the present invention.

FIG. 10 is an orthographic view of the cylinder kit 54 of the present invention. Shown are the bushing 24 and spacers 42 of different sizes used to adapt the cylinder kit 54 to a light truck's leaf spring.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A light truck support lift to provide a transitional adjustable support between an eyelet of a leaf spring and a leaf spring bracket, said support lift comprising:
   a) a chassis attachment assembly connectable to the leaf spring bracket;
   b) a leaf spring attachment assembly connectable to said leaf spring eyelet;
   c) a cylindrical bushing having a central throughbore;
   d) an elongate, substantially planar extension bar disposed at each end of said bushing extending downward towards said leaf spring eyelet; and e) a plurality of fastener apertures linearly disposed in said extension bars.

2. The light truck support lift recited in claim 1, wherein said leaf spring attachment comprises a pair of elongate spaced apart, substantially U-shaped receiving bars.

3. The light truck support lift recited in claim 2, wherein each said receiving bar comprises:
   a) a main plate;
   b) a plurality of fastener apertures linearly disposed in said main plate correlating with said fastener apertures in said extension bars; and
   b) sidewalls depending from the opposing edges of said main plate from the top portion thereof and terminating prior to the lowest said fastener aperture.

4. The light truck support lift recited in claim 3, wherein said sidewalls of said receiving bars are oriented medially towards one another.

5. The light truck support lift recited in claim 4, wherein said sidewalls and main plate of said receiving bars form a channel dimensioned to accept said extension bars therein in a slidable manner.

6. The light truck support lift recited in claim 5, wherein said bushing of said chassis attachment assembly has its central throughbore aligned with the uppermost fastener apertures of said extension bars and those of said leaf spring bracket and a bolt passed through said bushing and secured thereto with a washer and a nut.

7. The light truck support lift recited in claim 6, wherein each said receiving bar has its respective extension bar place in its respective channel with the associated fastener apertures coaligned at the selected position and fastened thereto with a bolt, nut and washer assembly.

8. The light truck support lift recited in claim 7, wherein said receiving bars are secured to opposing ends of said leaf spring eyelet with a bolt, nut and washer assembly.

9. The light truck support lift recited in claim 8, further including spacers with central throughbores that are disposed on opposing ends of said bushing to adapt to the width of said leaf spring eyelets and their respective leaf spring brackets in differing vehicles.

10. The light truck support lift recited in claim 9, wherein said spacers are available in a plurality of thicknesses to adapt to a multiplicity of vehicles.

11. A light truck or vehicle support lift to adjustably increase and decrease the distance between a leaf spring and a leaf spring bracket on a chassis of the vehicle, the support lift comprising:
   a) a cylindrical bushing to be bolted within a leaf spring bracket;
   b) a pair of planar extension bars descending from between the ends of said bushing and the leaf spring bracket;
   c) a plurality of linear fastener apertures disposed in said extension bars; and
   d) a pair of receiving bars comprising a main plate with a plurality of fastener apertures corresponding with those on said extension bars and depending sidewalls terminating prior to the bottommost fastener aperture.

12. The light truck or vehicle support lift recited in claim 11, wherein said bushing and extension bars are fastened to said leaf spring bracket with a bolt, washer and nut fastening assembly.

13. The light truck or vehicle support lift recited in claim 12, wherein said main plate and sidewalls of said receiving bars form a channel to enable said extension bars to slidably reside therein.

14. The light truck or vehicle support lift recited in claim 13, wherein said extension bars are disposed within their respective channels and coaligned with the fastener apertures of said receiving bars at a height differential as determined by the user.

15. The light truck or vehicle support lift recited in claim 14, wherein each extension bar and receiving bar is secured to one another with a plurality of bolt, washer and nut assemblies through the coaligned fastener apertures.

16. The light truck or vehicle support lift recited in claim 15, wherein the bottommost fastener apertures of said receiving bars are secured to the ends of said leaf spring eyelets via a bolt, washer and nut assembly.

17. The light truck or vehicle support lift recited in claim 16, further including a plurality of spacers of varying thicknesses with central throughbores for positioning on the ends of said bushing to adapt said bushing to the width of said leaf spring brackets of various vehicles and to position the related extension and receiving brackets accordingly for connection with said leaf spring eyelet.

\* \* \* \* \*